United States Patent [19]

Fritsch

[11] 4,438,875
[45] Mar. 27, 1984

[54] WHEELCHAIR CARRIER

[76] Inventor: William E. Fritsch, 756 Buffalo Cir., Carol Stream, Ill. 60187

[21] Appl. No.: 487,840

[22] Filed: Apr. 22, 1983

[51] Int. Cl.³ .............................................. B60R 9/06
[52] U.S. Cl. ...................... 224/42.03 R; 224/42.03 B; 224/42.06; 414/462
[58] Field of Search .............. 224/314, 315, 325, 273, 224/42.43, 42.03 R, 42.03 B, 42.03 A, 42.06, 42.07, 42.45 R, 42.46 R, 42.04, 42.08, 42.13, 42.21, 42.26; 414/462–466; 280/289 R; 248/311.2

[56] References Cited

U.S. PATENT DOCUMENTS

| | | | |
|---|---|---|---|
| 3,240,406 | 3/1966 | Logan . | |
| 3,275,206 | 9/1966 | Croft | 224/42.03 B |
| 3,458,073 | 7/1969 | Dawson | 414/462 |
| 3,504,831 | 4/1970 | Highnote | 224/42.03 B |
| 3,744,689 | 7/1973 | Kjensmo | 224/42.03 B |
| 3,800,967 | 4/1974 | Kosecoff . | |
| 3,853,255 | 12/1974 | Spencer | 224/42.06 X |
| 3,963,129 | 6/1976 | Clayton | 414/462 X |
| 4,084,736 | 4/1978 | Jacobs, Jr. . | |
| 4,088,253 | 5/1978 | Saffold . | |
| 4,213,729 | 7/1980 | Cowles et al. . | |
| 4,297,069 | 10/1981 | Worthington . | |

*Primary Examiner*—Allan N. Shoap
*Assistant Examiner*—Robert Petrik
*Attorney, Agent, or Firm*—John S. Fosse

[57] ABSTRACT

A carrier device for use in transporting a wheelchair on an automotive bumper comprises a rigid basket framework and a coupling unit for releasably mounting the framework to the car bumper.

5 Claims, 3 Drawing Figures

WHEELCHAIR CARRIER

FIELD OF THE INVENTION

This invention relates in general to carrier devices which are intended to be mounted on the exterior of a motor vehicle. The invention relates more particularly to externally mounted, motor vehicle carriers that are adapted for use in transporting a wheelchair.

BACKGROUND OF THE INVENTION

Persons using a wheelchair for locomotion require special provision for transporting that device when taking an automobile trip for medical, business or social purposes; and ordinarily, the confined person's attendant will collapse the wheelchair and store it in the trunk or seat space of the automobile or in the cargo area of the stationwagon or utility vehicle which is being used for transportation. This type of manipulation and handling of the average wheelchair requires considerable physical strength and dexterity because a wheelchair is inherently a heavy, bulky, awkward device; and in many instances, the attendant of choice in a given situation is the incapacitated person's aged spouse or parent lacking the requisite strength for the task, thus restricting the ease and therefore the frequency of trips.

In order to facilitate automobile travel for wheelchair persons, carrier devices have been proposed in the past for minimal ground clearance attachment to a car bumper. However, these prior art wheelchair carriers either have required an expensive, permanent installation, including for example the use of a "Class A" trailer hitch, or have incorporated mechanically unstable, unsafe constructions, such as pivoted hangers. The deficiencies of the prior art carriers have frustrated their wide acceptance and have encouraged resort to the earlier unsatisfactory manipulatory procedures.

SUMMARY OF THE INVENTION

The present invention overcomes the limitations of the prior art wheelchair carriers by providing a rigid, open basket framework to carry the wheelchair and by providing a quick-release coupling for easily, securely and selectively mounting the carrier basket on an automobile bumper.

Therefore, a general object of the present invention is to provide a new and improved motor vehicle carrier for wheelchairs.

Another object of the invention is to provide a wheelchair carrier which is selectively demountable from its transport vehicle.

Still another object of the invention is to provide a road-clearance adjustable, motor vehicle carrier for wheelchairs.

Yet another object of the invention is to provide a motor vehicle carrier for wheelchairs which is secure, comparatively inexpensive and easy to use.

These and other objects and features of the invention will become apparent from a consideration of the following descriptions.

BRIEF DESCRIPTION OF THE DRAWING

The invention both as to its construction and its mode of use, will be better understood by reference to the following disclosure and drawing forming a part thereof, wherein.

DETAILED DESCRIPTION OF THE DISCLOSED EMBODIMENT

Figure 1:
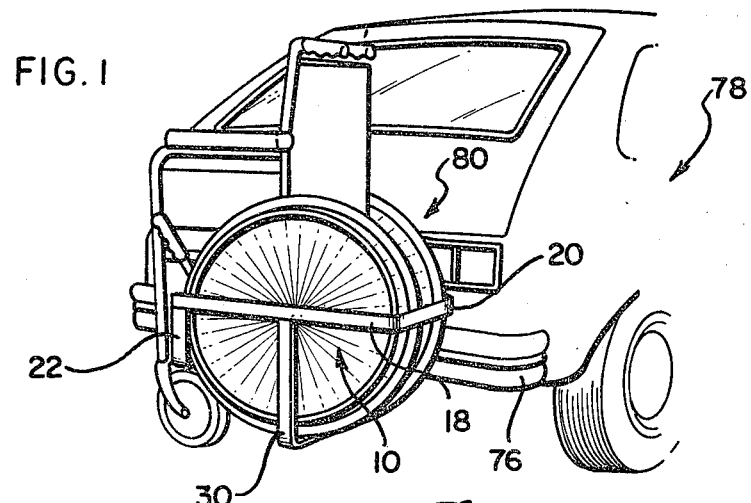
FIG. 1 is a perspective view showing a wheelchair carrier constructed in compliance with the present invention, demountably attached to the rear bumper of a compact car, and illustrated supporting a collapsed wheelchair for transport.
Figure 3:
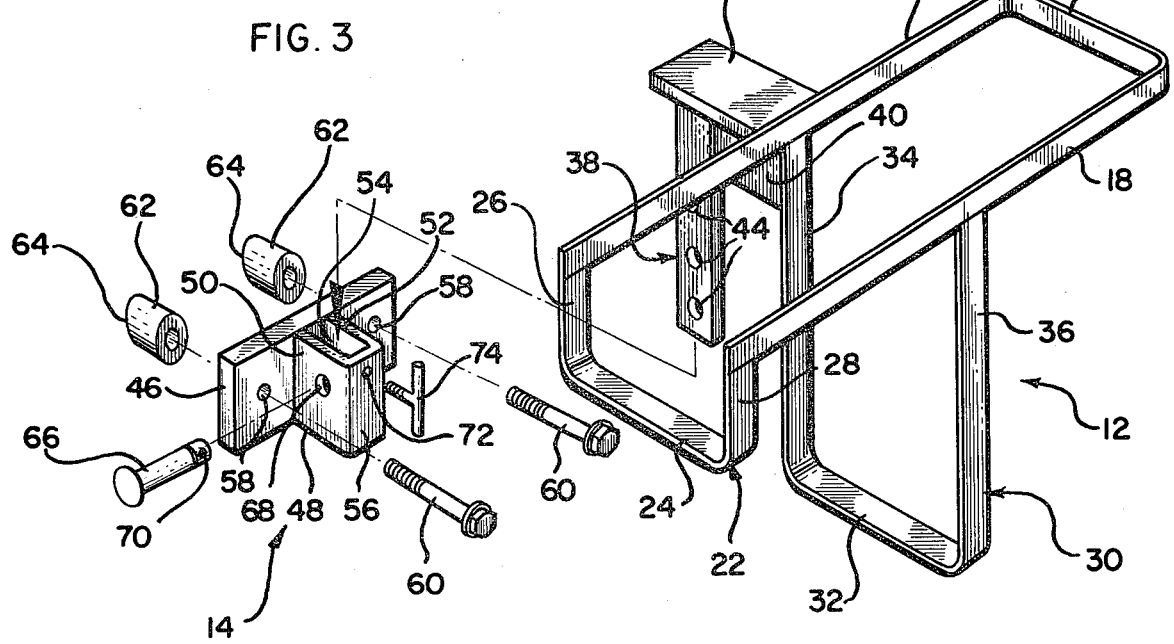
FIG. 3 is an exploded perspective view of the wheelchair carrier of FIGS. 1 and 2.

Referring now in detail to the drawing and giving first attention to FIG. 3, a wheelchair carrier indicated generally by the reference numeral 10 is constructed in compliance with the principles of the present invention to include a rigid, unitary basket framework 12 and a coupling unit 14 for releasibly mounting the framework 12 to an automobile bumper. The framework 12 includes a pair of generally parallel disposed sideframe members 16 and 18 which are spaced apart to receive the width of a collapsed wheelchair therebetween. A crossbrace 20 is employed to connect the respective back ends of the sideframe members 16 and 18 to close three sides of a generally horizontally disposed, rectangular quadrilateral. The crossbrace 20 additionally defines a first outstop for holding the wheelchair in position, as is shown in FIG. 1.

Returning to FIG. 3, a first pendant U-shaped member 22 joins the respective front ends of the sideframe members 16 and 18, pendant member 22 comprising a horizontal arm 24 which defines a second, opposing outstop for the wheelchair. Member 22 also includes a pair of vertical straps 26 and 28 which support the horizontal arm 24 for its use as a roll-up step in raising a wheelchair into the framework 12. The framework 12 additionally includes a second pendant, U-shaped member 30 which is attached intermediate the ends of the sideframe members 16 and 18, pendant member 30 being fashioned with substantially greater depth than the pendant member 22 in order to define a wheelchair downstop. Specifically, the pendant member 30 includes a horizontal arm 32 which supports the weight of a wheelchair, as is shown in FIG. 1, and a pair of side straps 34 and 36 which suspend the arm 32 from the sideframe members 16 and 18.

For purposes which will be described more fully hereinafter, the basket framework 20 also includes a vertical tongue 38 which is conveniently attached to the side strap 34 of pendant member 30 by means of a bracket plate 40 and a reinforcing, overlying crossplate 42. As will be described more fully hereinafter, the tongue 38 is perforated with a plurality of vertically aligned and vertically spaced apertures 44. Advantageously, the framework 12 is fabricated by bending and welding strip stock of a suitable stainless steel alloy for achieving strength and light weight as well as corrosion resistance upon exposure to various atmospheric conditions, including salt spray in seacoast regions.

In order to cooperate with the tongue 38 in mounting the framework 12 to an automotive bumper, the coupling unit 14 includes a bumper-mountable bracket plate 46 and a hollow box-like fixture 48 which is fastened to the bracket plate 46 to form a generally T-shaped component. The fixture 48 is fashioned with a pair of side plates 50 and 52 which define a slot 54 therebetween, and a back plate 56 joins the plates 50 and 52 spaced apart from the bracket plate 46.

The bracket plate 46 is perforated with a pair of mounting holes 58 on opposite sides of the fixture 48 in order to pass machine screws 60 or other suitable threaded fastener devices into pre-drilled holes in the bumper of the transporting automobile. As will be appreciated, flat washers, lock washers and nuts will be conveniently employed in completing the installation. Moreover, tubular spacers 62 may be advantageously fitted over the shanks of the screws 60 in making the installation. The spacers 62 are fabricated from a tough, semi-resilient material such as hard rubber and are formed with angle-cut ends 64 for matable engagement with correspondingly angled surfaces of the automotive bumper.

In order to establish primary connection between the basket framework 12 and the coupling 14, the tongue 38 will be slidably passed into the slot 54; and a selected bracket height will be determined by passing a headed cross-pin 66 through aligned bores 68 in the side plates 50 and 52, passing in the process through a selected one of the holes 44 in tongue 38. As will be recognized, varying degrees of load clearance can be selected by picking a particular one of the plurality of holes 44 for receiving the cross-pin 66. The free end of pin 66 is provided with a transverse bore 70 to admit the shackle of a padlock for use in securing the framework 12 to the coupling 14 in a secured position of road-clearance adjustment.

Chatter or wobble of the tongue 38 in the slot 54 is avoided by providing a threaded aperture 72 in the back plate 56 to receive a cooperatively threaded crank or set screw 74.

Having thus described one construction of the invention, it is important now to describe how the illustrated embodiment operates.

Figure 2:
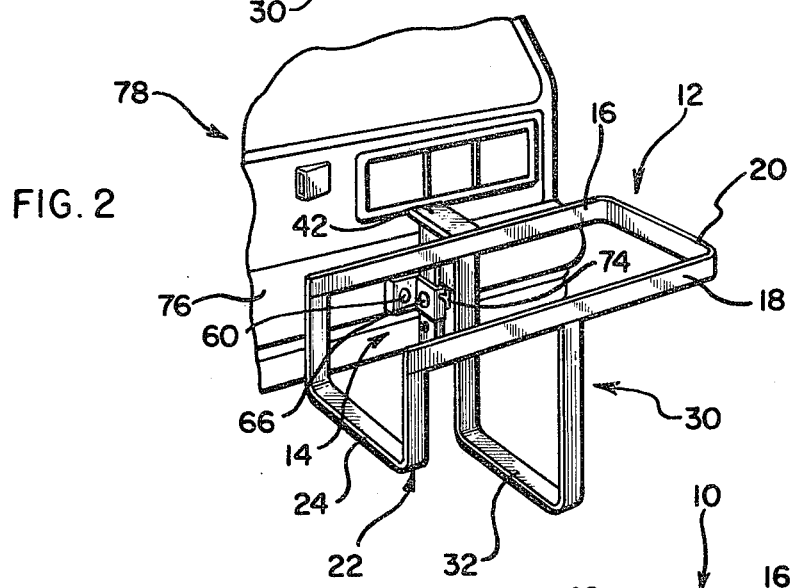
FIG. 2 is an enlarged perspective view of the wheelchair carrier of FIG. 1, showing the novel coupling of the invention used in attaching the carrier to the car bumper.

Assuming that the coupling unit 14 has been attached to the rear bumper 76 of an automobile 78 by means including the screws 60, as is shown in FIG. 2, the empty framework 12 will be assembled with the coupling unit by passing the tongue 38 into the slot 54 of fixture 48 and by fixing a selected road clearance through the alignment of appropriate sets of apertures 68 and 44 using the cross-pin 66. The carrier 10 is now ready to receive a collapsed wheelchair 80 in the transport position shown in FIG. 1.

In elevating the wheelchair into this transport position, it is merely necessary to roll the collapsed chair into alignment with the open front end of the basket framework 12 until the main wheels of the chair encounter the horizontal arm 24. At this point, further pressure or force causes the chair wheels to roll up over the arm 24 and drop into engagement with the downstop arm 32, the tires of the wheelchair wheels resting against the crossbrace 20 and the arm 24 to secure the chair in position.

As will be appreciated, the wheelchair 80 may be strapped or otherwise secured in the carrier 10 by auxiliary safety device; and furthermore, an impervious cover can be provided for protecting the wheelchair 80 from inclement weather conditions.

From the foregoing descriptions, it will be apparent that the basket framework of the present wheelchair carrier can be readily removed from the automobile 78 and stored separately. In addition, the basket framework can be used on more than one vehicle by the expedient of using duplicate coupling units. Moreover, it will be appreciated that no special tools or expensive components are required in installation. Finally, the basket framework can be positioned on an individual car bumper so as to minimize any interference with driver visibility.

The drawing and the foregoing descriptions are not intended to represent the only form of the invention in regard to the details of its construction and manner of operation. Changes in form and in the proportion of parts, as well as the substitution of equivalents, are contemplated as circumstances may suggest or render expedient; and although specific terms have been employed, they are intended in a generic and descriptive sense only and not for the purposes of limitation, the scope of the invention being delineated in the following claims.

The invention is claimed as follows:

1. A wheelchair carrier comprising: a rigid basket framework, including a pair of sideframe members spaced apart to receive the width of a collapsed wheelchair therebetween, a crossbrace joining respective back ends of said sideframe members and defining a first outstop, a first pendant, U-shaped member joining respective front ends of said sideframe members to define both a second, opposed outstop and a roll-up step for use in raising a wheelchair into said framework, and a second pendant, U-shaped member attached intermediate the ends of said sideframe members and having substantially greater depth than said first U-frame member to define a wheelchair downstop; and coupling means for releasibly mounting said framework to an automotive bumper.

2. A wheelchair carrier according to claim 1 wherein said coupling means includes a tongue on said framework and bumper-mountable bracket means having spaced plates defining a slot for slidably receiving said tongue.

3. A wheelchair carrier according to claim 2 wherein one of said tongue and said plates is singly apertured and the other of said tongue and said plates is vertically multiply apertured and wherein said carrier further includes cross-pin means for entering selected apertures in said tongue and in said plates whereby to connect said framework and said coupling means and whereby to adjust the road-clearance of said carrier.

4. A wheelchair carrier according to claim 3 wherein said cross-pin is transversely bored to receive the shackle of a padlock for use in securing said framework to said coupling means in a selected position of road-clearance adjustment.

5. A wheelchair carrier according to claim 2 which further comprises set-screw means for securing said tongue in said slot and against free, relative motion.

* * * * *